(12) United States Patent
Fling et al.

(10) Patent No.: US 12,050,300 B2
(45) Date of Patent: Jul. 30, 2024

(54) MAGNETIC COUPLER FOR INDUCING A SIGNAL ON A UTILITY LINE

(71) Applicant: The Charles Machine Works, Inc., Perry, OK (US)

(72) Inventors: Richard William Fling, Staffordshire (GB); Brian K. Bailey, West Des Moines, IA (US)

(73) Assignee: The Charles Machine Works, Inc., Perry, OK (US)

( * ) Notice: Subject to any disclaimer, the term of this patent is extended or adjusted under 35 U.S.C. 154(b) by 85 days.

(21) Appl. No.: 17/844,534

(22) Filed: Jun. 20, 2022

(65) Prior Publication Data

US 2022/0317326 A1    Oct. 6, 2022

Related U.S. Application Data

(63) Continuation of application No. 16/926,346, filed on Jul. 10, 2020, now abandoned.

(60) Provisional application No. 62/872,919, filed on Jul. 11, 2019.

(51) Int. Cl.
*G01V 3/10* (2006.01)

(52) U.S. Cl.
CPC ...................... *G01V 3/10* (2013.01)

(58) Field of Classification Search
None
See application file for complete search history.

(56) References Cited

U.S. PATENT DOCUMENTS

| 4,378,525 | A | 3/1983 | Burdick |
| 5,264,795 | A | 11/1993 | Rider |
| 7,288,929 | B2 * | 10/2007 | Prsha ..................... G01V 3/081 |
| | | | 324/127 |
| 2006/0232258 | A1 | 10/2006 | Mercer et al. |
| 2007/0017301 | A1 | 1/2007 | Prsha et al. |
| 2017/0017010 | A1 * | 1/2017 | Olsson ................... G01S 19/42 |
| 2018/0059148 | A1 | 3/2018 | Geisler et al. |

OTHER PUBLICATIONS

Subsite Electronics "Accessories Catalog" catalog, 2016, 13 pages.

* cited by examiner

*Primary Examiner* — Noam Reisner
(74) *Attorney, Agent, or Firm* — Tomlinson McKinstry, P.C.

(57) ABSTRACT

A magnetic coupler for inducing a signal on a buried utility wire. The coupler has two elongated jaws, each extending along a separate longitudinal axis. The jaws are attached at a hinge. The jaws may be placed about an exposed portion of the utility wire. A signal generate provides a signal which is emitted from a transmitter in each of the jaws. The signals emitted from each jaw are antiphase to one another, such that they are additive to a utility wire disposed between the jaws but out of phase with respect to any utility not between the jaws. The signal is thus induced on the utility wire and can be detected as emitted from its below ground length by a conventional locator.

19 Claims, 5 Drawing Sheets

MAGNETIC COUPLER FOR INDUCING A SIGNAL ON A UTILITY LINE

SUMMARY

The present invention is directed to an apparatus. The apparatus has a first frame, a second frame, and a hinged connection between the first frame and the second frame. The first frame has a first jaw with a substantially planar surface and a first electromagnetic transmitter capable of generating a first magnetic field. The second frame has a second jaw with a substantially planar surface and a second electromagnetic transmitter capable of generating a second magnetic field. The first magnetic field is antiphase to the second magnetic field. The hinged connection modifies an orientation between the first substantially planar surface and the second substantially planar surface.

In another aspect, the invention is directed to an apparatus. The apparatus comprises a first and second elongate jaw, a hinge, a handle, a first transmitter, and a second transmitter. Each elongate jaw defines a longitudinal axis extending along a length of its respective jaw. The hinge connects the first jaw and the second jaw about a pivot axis extending through the hinge. The pivot axis is orthogonal to the longitudinal axis of both the first and second elongate jaw. The handle is configured to cause relative rotation of the jaws about the hinge. The first transmitter is disposed of in the first elongate jaw and configured to emit a first signal. The second transmitter is disposed in the second elongate jaw and configured to emit a second signal.

DETAILED DESCRIPTION

Figure 1:
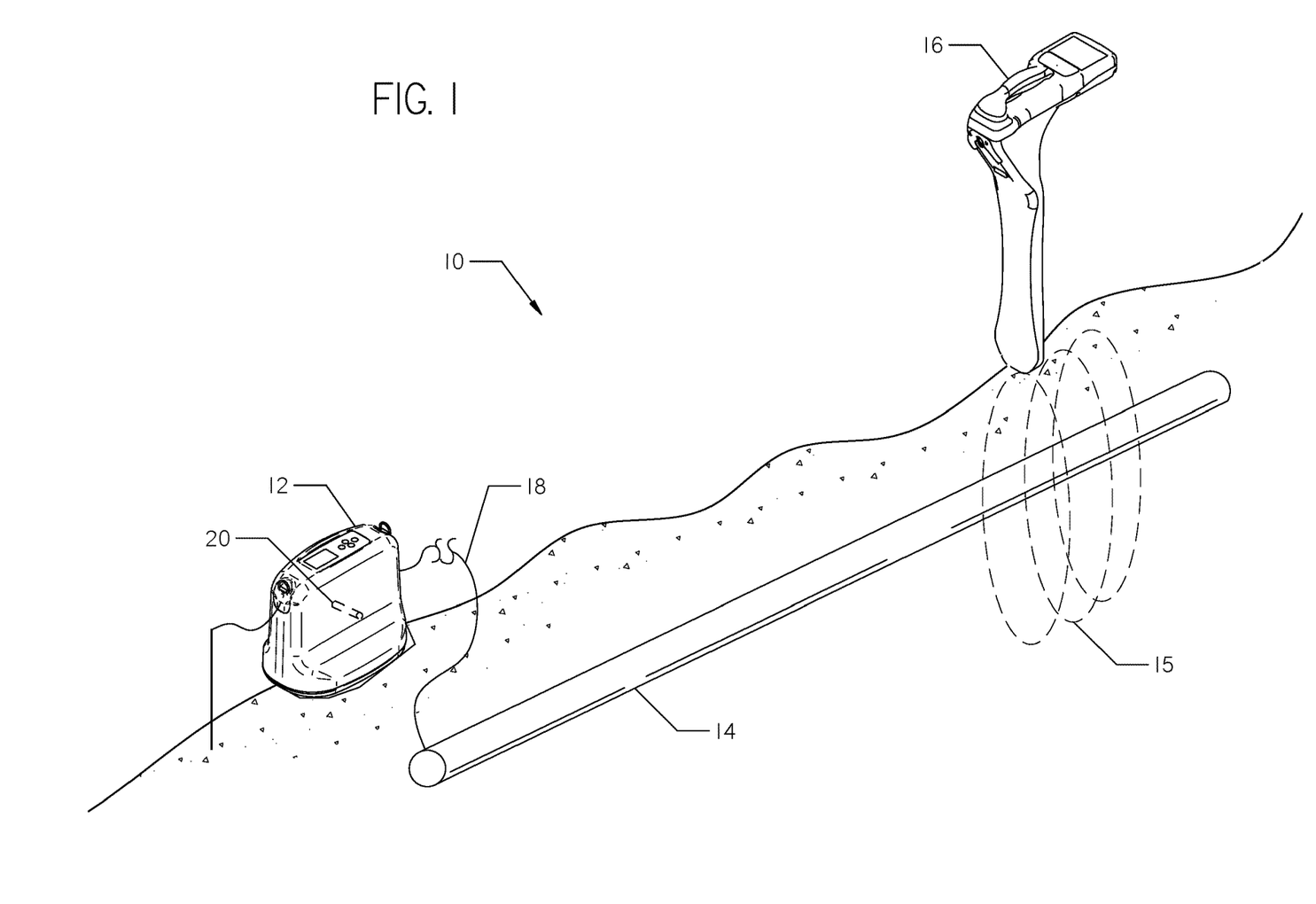
FIG. 1 is a diagrammatic representation of a locating operation.

Turning now to the figures, FIG. 1 shows an electromagnetic utility locating system 10. Such systems 10 are utilized prior to digging in an area where buried utility lines may be present. Typically, a transmitter 12 is coupled to a target utility line 14 such that the utility line is "illuminated" with the signal 15 and is detectable by an above-ground locator 16. The transmitter 12 may provide both an inductive output for indirect signal 15 coupling to a utility line 14 and a wired output for direct connection to the utility line through wire 18. Direct signals are not caused by fields generated by the transmitter, but rather a signal current placed on the utility line 14 via the wire. Indirect signals may be the result of a signal generator 20 disposed at the transmitter 12 emitting a signal which is then received at the target line 14 and carried along its length.

Indirect or inductive signal coupling requires the transmitter 12 be placed near the utility line 14 such that there is an inductive coupling. Typically, the signal is an alternating current signal. The induction process may be inefficient as the magnetic energy induced reduces by the inverse cube of the distance between the signal generator 20 of the transmitter 12 and the utility line 14. Energy emitted by the signal generator 20 may also couple to other buried utilities in close proximity. This may cause interference in locating the line of interest.

The locator 16 ordinarily cannot be used in proximity to the transmitter 12 during inductive coupling as the induction signal will "air couple" to the receiver antenna of the locator. Such air coupling reduces the effectiveness of the locator 16. The locator 16 is therefore ordinarily placed approximately 30 ft. or more from the transmitter 12.

Using the direct connection output wire 18 of the transmitter 12 is preferred, and considered the best method in many applications. An electrical circuit is formed between a metal earth pin connected to the local ground surface or other earth connected metallic structure (fence, earth rod or metal street sign) and to the utility line 14. The resulting electrical signal circuit formed enables the transmitter 12 signal current to flow in the utility line 14 and by ground current return back to the earth pin.

When a direct connection is unavailable, the propensity of the emitted signal to induce currents on lines other than the target line 14 will significantly reduce the quality of the location operation. However, because some target lines 14 do not have access points for direct signal coupling, inductive coupling is often the only practical method that is effective on site.

The locator 16 detects the transmitter 12 current and processes the detected signals to localize the 3D position of the utility line 14 carrying the signal. This is accomplished with a combination of antennas, frequency selective circuits, and signal processing techniques. The locating process itself is not part of this invention, but may be understood as a combination of signal strength measurements or signal phase comparison between a multiplicity of receiving antenna signals that can be processed by electrical signal processing circuits to provide a means to locate and pinpoint the buried utility carrying the transmitter signal. A detailed discussion of a standard locate operation is found in U.S. Pat. No. 5,264,795, issued to Rider, the contents of which are incorporated by reference herein.

In indirect applications, to reduce the likelihood of induction on a non-target line, a magnetic ring clamp, also known as a coupler, may be used to magnetically couple the transmitter electrical signal current to the target line.

Such ring clamps are designed with a split core that enables the clamp to be hand operated to open the clamp, placed coaxially around the utility cable and closed again for convenient operation. The coupler may be fitted to a range of cable sizes. The coupler is limited by the opening jaw size and closed internal diameter of the ring. Common sizes are 3, 4, 5 and 7-inch diameter clamps. One such ring-shaped coupler is shown in U.S. Pat. No. 7,288,929, issued to Prsha, et al.

A weakness of the magnetic clamp techniques and design is that the clamp must be placed coaxially around the cable and its jaws must be closed to ensure that the magnetic circuit is complete. This may not be practical in situations where a cable comes down the side of an overhead utility pole, down a wall or is laid in a cable tray ducting.

A further weakness is that the clamp must be designed to operate with a range of transmitter signal frequencies, where the magnetic losses due to the core material and magnetic efficiency become significant design factors and reduce the amount of the transmitter signal that can be coupled to the utility cable.

Some transmitters output a signal from 263 Hz to 200 kHz. The clamps are often designed for a limited range of signal frequencies from 8 kHz or higher and are commonly optimized for 29 kHz. These design compromises reduce the effectiveness of the transmitter and may not enable an optimum signal frequency to be selected in an environment where there is a large amount of signal noise. Further, accuracy is enhanced in some situations by using the lowest effective frequency, and such clamps are not designed to utilize low frequencies.

With reference now to FIGS. 2-5, a flat-jaw magnetic coupler 30 is shown. The flat-jaw coupler overcomes the weaknesses described above. The coupler 30 provides for a close-proximity magnetic induction but without requiring a clamp to coaxially surround the cable 14. In addition, the risk of air-coupled interference is minimized, allowing the locator 16 and coupler 30 to be placed closer together, which is advantageous when space is limited.

The magnetic coupler 30 preferably is adapted to transmit a signal having a wide range of operational frequencies, including frequencies below 8 kHz.

Figure 2:
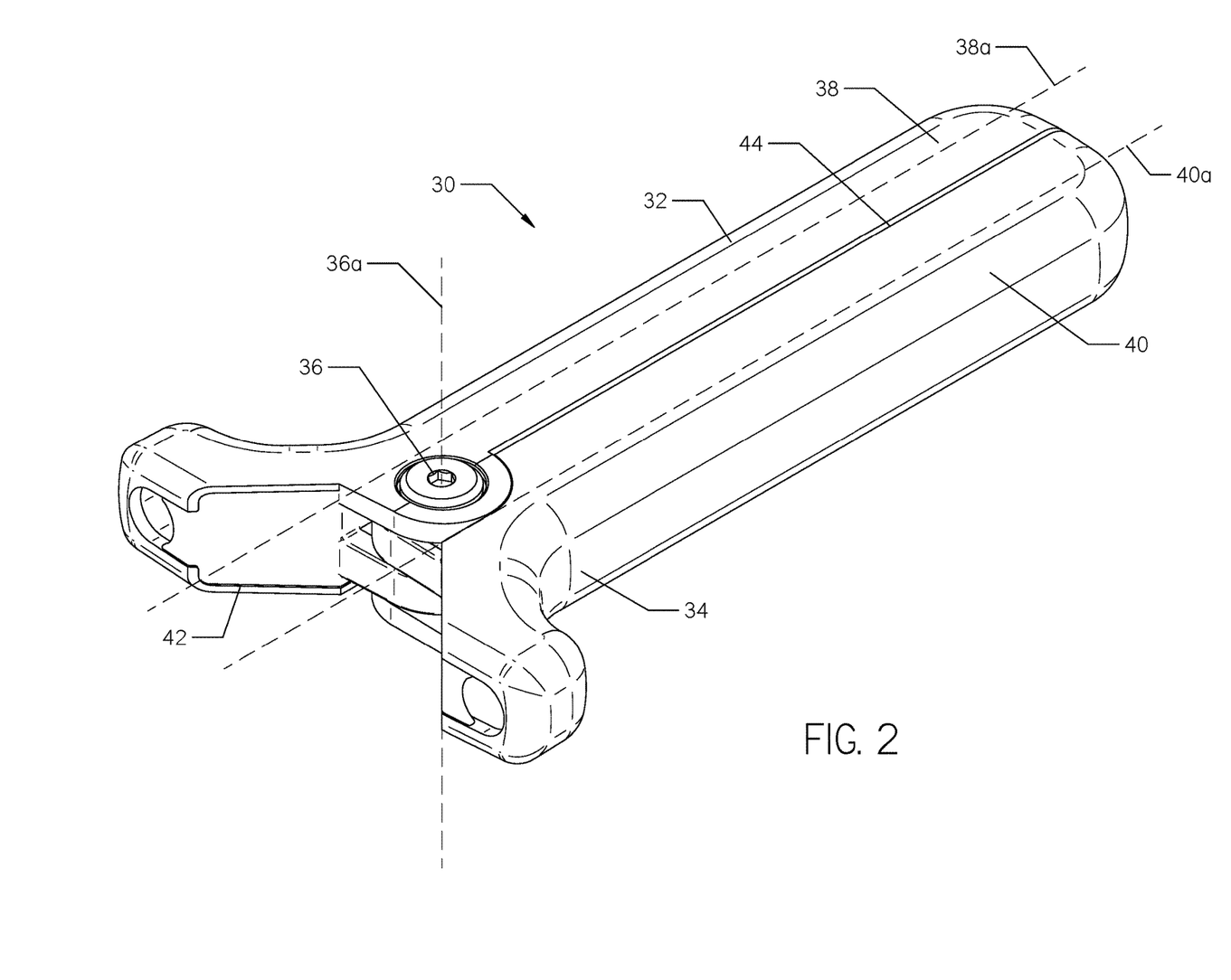
FIG. 2 is an isometric view of a magnetic coupler.

With reference to FIG. 2, the coupler 30 comprises a first frame 32 and a second frame 34. The first 32 and second 34 frames are connected at a hinge 36. On a first side of the hinge, the first frame 32 comprises a first jaw 38. On the first side of the hinge, the second frame 34 comprises a second jaw 40. Each jaw 38, 40 extends along a longitudinal axis 38a, 40a. Each jaw 38, 40 rotates about the hinge 36, and the longitudinal axes 38a, 40a are orthogonal to a rotational axis 36a of the hinge.

On the second side of the hinge 36, each of the first 32 and second 34 frame comprise a handle 42.

Figure 3:
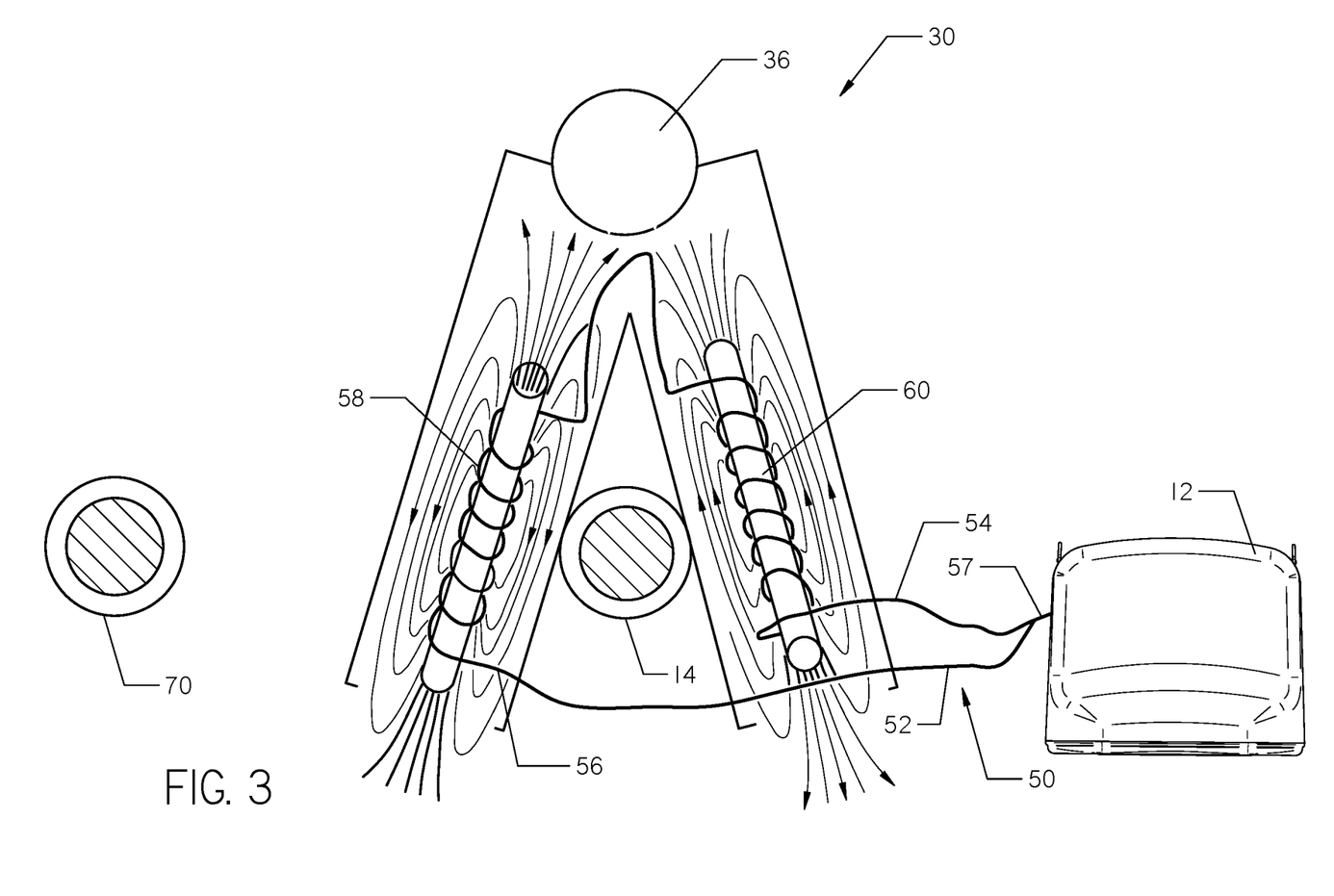
FIG. 3 is a diagrammatic representation of a magnetic coupler.
Figure 4:
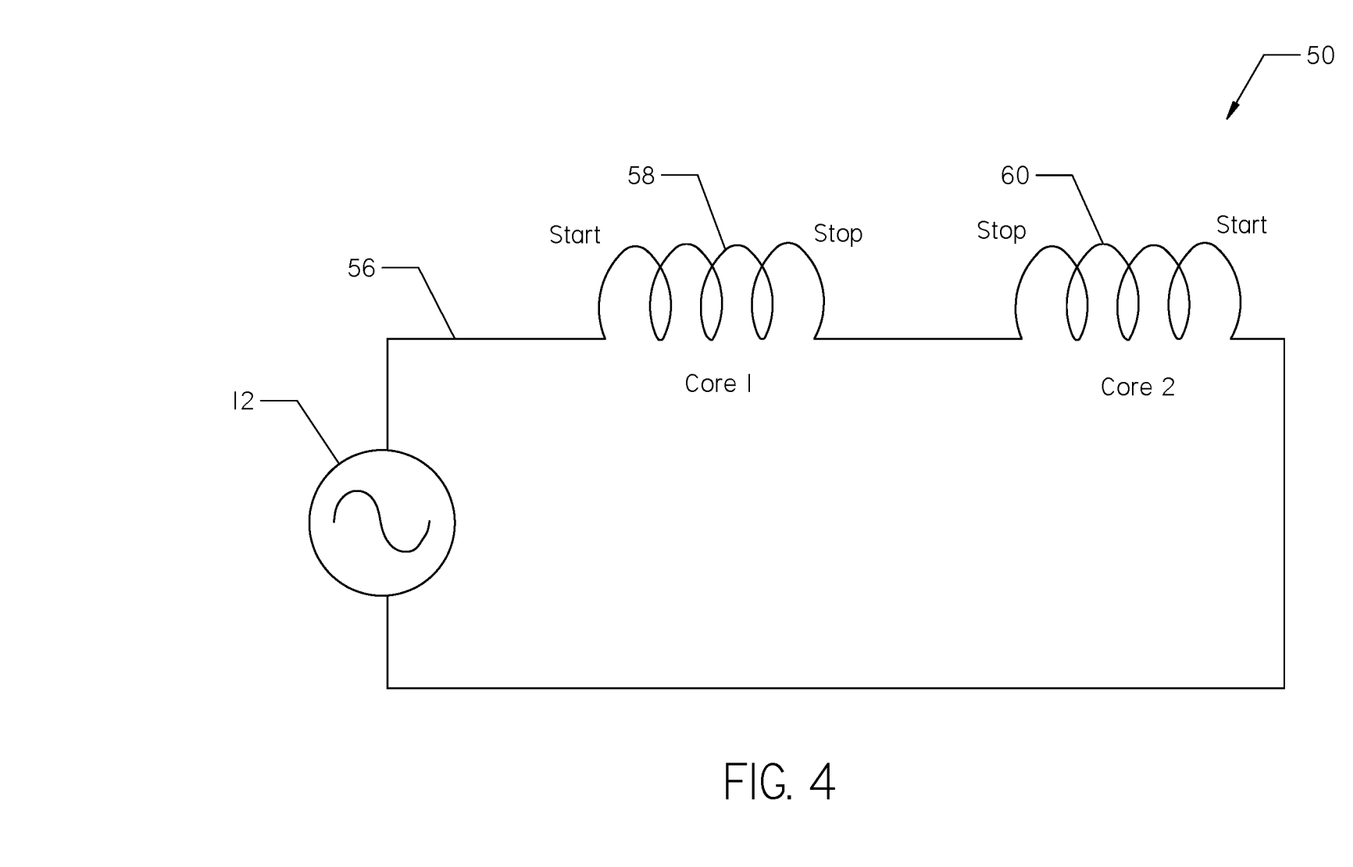
FIG. 4 is a circuit diagram representing the transmitter and magnetic coupler.

The handle 42 is configured such that the first 38 and second 40 jaws may be placed in an open configuration by manipulating the handle. When in the open configuration, as shown in FIG. 3, the longitudinal axes 38a, 40a, of the respective jaws 38, 40 are at an angle relative to one another, measured at the hinge 36. This angle can vary depending on the nature of the job required for the coupler 30, the position of a wire 14 within the jaws, and the diameter of the wire 14. When in the closed configuration shown in FIG. 2, the longitudinal axes 38a, 40a are parallel.

Each jaw 38, 40 has a substantially planar contact surface 44 which is configured for placement against a wire 14 or other structure. The hinge 36 biases the frames 32, 34 into the closed configuration, which may be overcome when an object is placed between the contact surfaces 44 when the coupler is opened. With reference to FIG. 3, the coupler 30 is shown in an open configuration with the contact surfaces 44 resting against the outer sheath of a magnetic wire 14.

In FIG. 3, interior components of the coupler 30 are shown. The coupler 30 comprises an electrical circuit 50. The circuit 50 comprises the transmitter 12, a first wire connection 52, a second wire connection 54, and a winding 56. The winding 56 is internal to the first frame 32 and second frame 34. The winding 56 is coupled to the transmitter 12 by the first 52 and second 54 wire connections. The first and second wire connections may be included in the same wire 57.

The winding 56 is wound about a first magnetic core 58 within the first frame 32 and a second magnetic core 60 within the second frame 34. The cores 58, 60 are comprised of the winding 56 turned around an electromagnetic base. This base may be made of laminated strip steel or a ferromagnetic material. Each core 58, 60 is a signal transmitter capable of emitting a field. The number of turns of the winding 56 in each core 58, 60 and wire gauge of the winding is optimized for impedance matching with the transmitter 12 at a pre-selected frequency.

For example, one such frequency may be 3.14 kHz. For this frequency, a 30 gauge winding 56 may be used having 1400 turns at each core 58, 60. Winding turns may be adjusted to give a good electrical match to the transmitter impedance and resulting delivery of electrical current at the chosen frequency and for the chosen core structure.

The coupler 30 can be placed around a utility wire 14 to be located, and can accommodate several different sizes of such wires or, for example, a utility wire which is against an obstruction, such as a utility pole. The coupler is preferably adjusted such that each core 58, 60 is centrally located and orthogonal to a longitudinal axis of the utility wire 14.

A magnetic signal in each core 58, 60 will induce an electrical signal in the utility wire 14, as the cores 58, 60 are connected in series and arranged so that the resulting magnetic fields are in antiphase to each other. For example, the first core 58 may be assembled to have north-south polarity while the second core 60 is assembled to have south-north polarity. As the cores 58, 60 are on opposite sides of the utility wire 14, the resultant induced signal will be in phase and additive. Though the cores 58, 60 are in series in FIGS. 3 and 4, the cores could be in parallel and accomplish the same function.

An adjacent cable 70 is shown in FIG. 3. The exposure of an adjacent cable 70 to the induced signal will be mitigated by the fact that the opposite fields generated by the two cores 58, 60 will be out of phase, as each core is on the same side of any cable not between the cores of the coupler 30.

The coupler 30 may incorporate features to locate the cable midway along its cores 58, 60 and perpendicular to the axis of the utility wire 40. The hinge 36 enables the cores to be adjusted to proximity of different sized cables. In addition, it may be advantageous to incorporate an extension (not shown) into the coupler 30 such that the coupler can be placed about a cable 14 in a buried hole or other confined spaces.

Figure 5:
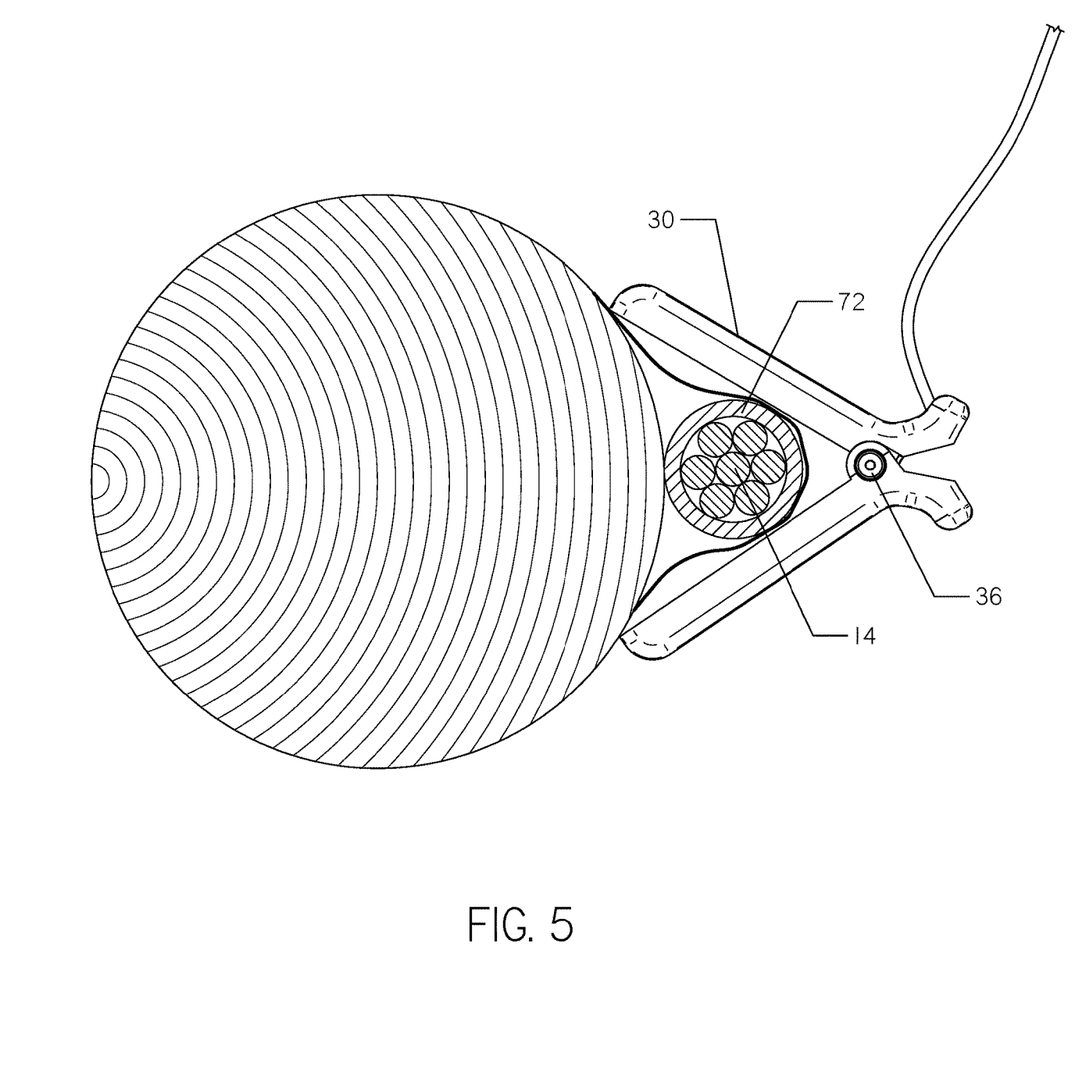
FIG. 5 is a diagram of a coupler being used with a cable and utility pole protected by a cover.

For example, in FIG. 3, the coupler 30 is shown about a wire 14, directly contacting its insulated sheath. In FIG. 5, the wire 14 is disposed inside a cable duct 72 and positioned against a utility pole, requiring the jaws to be opened at a wide angle as compared to FIG. 3. As shown, the coupler 30 is able to be positioned astride the wire 14 in either scenario.

In operation, the coupler 30 is attached to the transmitter 12. A frequency is chosen for locating a particular utility wire 14. The coupler 30 is opened at its hinge 36 so that the wire 14 may be placed between the first jaw 38 and second jaw 40 at an above ground location. Preferably, the wire 14 is placed such that each core 58, 60 found in each jaw 38, 40 is centered on the utility wire 14 and orthogonal thereto.

The transmitter 12 is then activated at the chosen frequency. A first signal is emitted from the first core 58. Likewise, a second signal, at the same frequency but with opposite phase, is emitted from the second core 60. Because the utility wire 14 is between the cores 58, 60, a signal is induced the utility wire 14. The signal is then emitted at portions of the wire 14 that are underground. The emitted, induced signal is detected by a conventional locator 16, such that the underground path and depth of the utility wire 14 can be determined.

Because the first and second signals are of opposite phase, an adjacent wire 70 has little or no induced signal which would lower the accuracy of the locating operation. If the adjacent wire 70 needs to be located, the coupler 30 can be removed from utility wire 14 and placed about the adjacent wire 70 and the process repeated.

Changes may be made in the construction, operation and arrangement of the various parts, elements, steps and procedures described herein without departing from the spirit and scope of the invention as described in the following claims.

The invention claimed is:

1. A method of detecting a signal on a single line in a multi-line environment, comprising:
    placing a pair of elongate jaws on opposite sides of a first line, wherein each of the elongate jaws is disposed along a substantially linear path;
    transmitting an electromagnetic signal within each of the pair of elongate jaws, such that the signal is induced and additive on the first line and is destructive interference to a second line, wherein the pair of elongate jaws are not on opposite sides of the second line; and
    at an above ground location, detecting the induced and additive signal to determine a below-ground location of the first line.

2. The method of claim 1 wherein the pair of elongate jaws comprises a first jaw and a second jaw and wherein the step of transmitting an electromagnetic signal comprises:
    transmitting a first signal from the first jaw; and
    transmitting a second signal from the second jaw.

3. The method of claim 2 wherein the first signal is antiphase to the second signal.

4. The method of claim 1 in which the pair of elongate jaws are each oriented orthogonally to the first line.

5. The method of claim 1 in which the pair of elongate jaws are joined at a hinge.

6. The method of claim 1 in which the pair of elongate jaws are characterized as a first pair of elongate jaws, wherein the method further comprises:
    placing a second pair of elongate jaws on the second line; and
    while the first pair of elongate jaws is transmitting the electromagnetic signal, transmitting a second electromagnetic signal from the second pair of elongate jaws, such that the second signal is induced and additive on the second line.

7. A method of using an apparatus, the apparatus comprising:
    a first and second elongate jaw, each elongate jaw defining a longitudinal axis extending along a length of its respective jaw;
    a hinge connecting the first jaw and the second jaw about a pivot axis extending through the hinge, in which the pivot axis is orthogonal to the longitudinal axis of both the first and second elongate jaw;
    a handle configured to cause relative rotation of the jaws about the hinge;
    a first transmitter disposed in the first elongate jaw, configured to emit a first signal; and
    a second transmitter disposed in the second elongate jaw, configured to emit a second signal;
    the method comprising:
        placing the first and second elongate jaws on opposite sides of a utility wire at an above-ground location, wherein at least part of the utility wire is disposed at a below-ground location;
        with a signal generator, generating a signal at a preselected frequency;
        emitting the signal from the first transmitter as the first signal;
        simultaneously, emitting the signal from the second transmitter as the second signal; and
        at an above-ground location, detecting an induced magnetic field to determine a below-ground location of the utility wire.

8. The method of claim 7, in which the utility wire is characterized as a first utility wire, and further comprising:
    removing the first and second elongate jaws from the first utility wire; and
    placing the first and second elongate jaws on opposite sides of a second utility wire at an above-ground location, wherein at least part of the second utility wire is disposed at a below-ground location;
    while placed about the second utility wire, emitting the signal from the first transmitter as the first signal;
    simultaneously, emitting the signal from the second transmitter as the second signal; and
    at an above-ground location, detecting an induced magnetic field to determine a below-ground location of the second utility wire.

9. The method of claim 8 in which the angle between the longitudinal axis of the first and second jaw is larger when the first and second jaws are placed about the second utility wire than when the first and second jaws are placed about the first utility wire.

10. The method of claim 9 in which the first signal is antiphase to the second signal.

11. The method of claim 7 in which the first signal is antiphase to the second signal.

12. The method of claim 7 in which the utility wire is characterized as a first utility wire and the preselected frequency is characterized as a first pre-selected frequency, and further comprising:
    placing a second apparatus comprising a third and fourth elongate jaw such that the third and fourth elongate jaw are on opposite sides of a second utility wire at an above ground location;
    with the signal generator, generating a third signal at a second pre-selected frequency, wherein the second preselected frequency is different than the first preselected frequency; and
    at the above-ground location, detecting an induced magnetic field to determine the below-ground location of the second utility wire.

13. A method of detecting a conductive line in a field, comprising:
    generating a first signal at a signal coupler comprising a first jaw comprising a first linear core antenna and a second signal at a second jaw comprising a first linear core antenna, the first and second signal having substantially the same frequency, and wherein the signal coupler defines:
        a first region on a first side of each of the first and second jaw;
        a second region on a second side of each of the first and second jaw; and
        a third region on the first side of the second jaw and the second side of the first jaw;
    wherein the first signal and second signal are additive within the third region and wherein the first signal and second signal are substantially opposite within the first region and the second region.

14. The method of claim 13 further comprising:
    situating the first jaw and second jaw with a first line therebetween; and
    detecting an induced signal from an underground portion of the first line.

15. The method of claim 13 in which the peak of the first signal is at the peak of the second signal within the third region.

16. The method of claim 13 in which the peak of the first signal is equal and opposite to the peak of the second signal within the first region and the second region.

17. The method of claim 13 further comprising:
situating the first jaw and second jaw with a first line therebetween, the first jaw and second jaw being defined by a first angle at which the first jaw and the second jaw meet;
detecting an induced signal from an underground portion of the first line;
thereafter, situating the first jaw and second jaw with a second line therebetween, the first jaw and second jaw being defined by a second angle at which the first jaw and the second jaw meet; and
detecting an induced signal from an underground portion of the second line.

18. The method of claim 17 in which the first line is in the first region of the signal coupler when the second line is in the third region of the coupler.

19. The method of claim 13 in which the first signal and second signal are less than 8 kilohertz.

* * * * *

UNITED STATES PATENT AND TRADEMARK OFFICE
CERTIFICATE OF CORRECTION

| | | |
|---|---|---|
| PATENT NO. | : 12,050,300 B2 | |
| APPLICATION NO. | : 17/844534 | |
| DATED | : July 30, 2024 | |
| INVENTOR(S) | : Fling et al. | |

It is certified that error appears in the above-identified patent and that said Letters Patent is hereby corrected as shown below:

On the Title Page

Under item (57) the Abstract section, Line 5, please delete "generate" and substitute therefor "generator".

In the Specification

Column 1, Line 28, please delete "in the".
Column 4, Line 55, after "induced" please insert --on--.

Signed and Sealed this
Twenty-seventh Day of August, 2024

Katherine Kelly Vidal
*Director of the United States Patent and Trademark Office*